Figure 1:
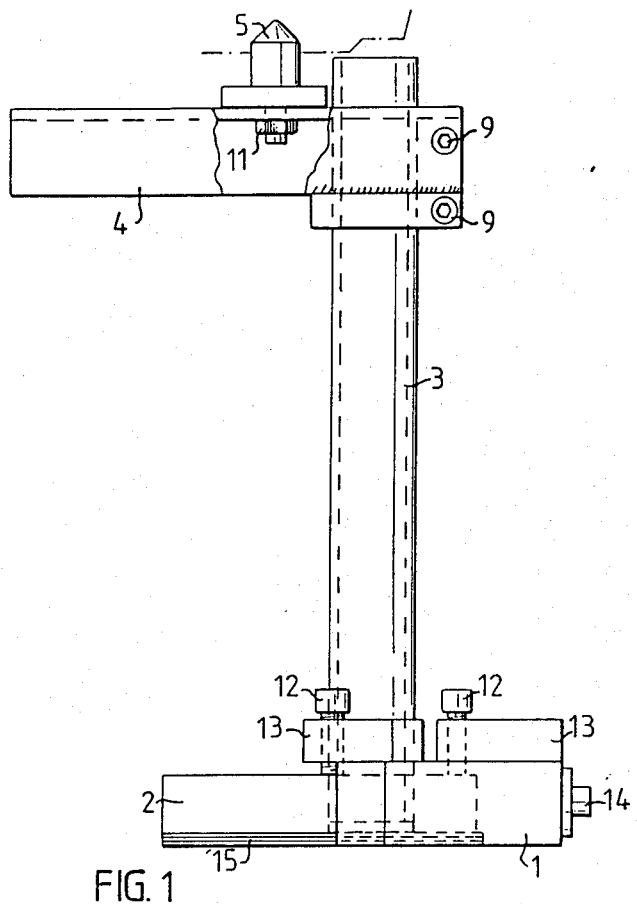

United States Patent [19]

Persson et al.

[11] Patent Number: 4,854,567
[45] Date of Patent: Aug. 8, 1989

[54] DEVICE FOR LOCALIZING AND/OR HOLDING AN OBJECT

[75] Inventors: Jan Persson, Olofström; Jan Rangståhl, Bromölla, both of Sweden

[73] Assignee: AB Volvo, Gothenburg, Sweden

[21] Appl. No.: 159,420

[22] Filed: Feb. 4, 1988

[30] Foreign Application Priority Data

Feb. 13, 1987 [SE] Sweden .............................. 8700585

[51] Int. Cl.$^4$ .............................................. B23Q 1/04
[52] U.S. Cl. .................................................... 269/71
[58] Field of Search .................. 269/309, 310, 45, 41, 269/71, 73, 303, 315, 277, 279

[56] References Cited

U.S. PATENT DOCUMENTS

| | | | |
|---|---|---|---|
| 456,891 | 7/1891 | Fish | 269/45 |
| 1,063,934 | 6/1913 | Morton . | |
| 1,204,433 | 11/1916 | Hanna | 269/279 |
| 2,051,427 | 8/1936 | Snavely | 269/73 |
| 2,675,608 | 4/1954 | Vines et al. . | |
| 2,799,920 | 7/1957 | Hansen | 269/303 |
| 4,084,802 | 4/1978 | Cannon | 269/41 |
| 4,610,442 | 9/1986 | Oku et al. | 269/73 |

FOREIGN PATENT DOCUMENTS

| | | |
|---|---|---|
| 3538034 | 9/1986 | Fed. Rep. of Germany . |
| 2526347 | 11/1983 | France . |
| 356244 | 5/1973 | Sweden . |
| 1175117 | 12/1969 | United Kingdom . |

*Primary Examiner*—Robert C. Watson
*Attorney, Agent, or Firm*—Young & Thompson

[57] ABSTRACT

The invention relates to a device for localizing and/or holding an object firmly, preferably in fixtures and the like. The device includes a base part (2) which is intended to be fitted to a support surface, a spacing arm (3) which is attached to the base part, and an object attachment (4) for accommodating the object to be localized and/or held. In accordance with the invention, the base part (2) is provided with a flat bottom surface for abutment with the support surface and two abutment surfaces which extend perpendicularly to one another and to the bottom surface. The device further comprises a localizing member (1) which is intended to hold the base part (2) firmly against the support surface and which is provided with abutment surfaces intended for abutment with the abutment surfaces on the base part (2), so as to localize the base part in relation to the localizing member (1).

12 Claims, 1 Drawing Sheet

U.S. Patent

Aug. 8, 1989

4,854,567

DEVICE FOR LOCALIZING AND/OR HOLDING AN OBJECT

The present invention relates to a device for localizing and/or holding an object firmly, preferably in a fixture or like device, and comprising a base part which is intended to be fitted to a support surface, a spacing arm which is attached to the base part, and an attachment which can be fitted to the spacing arm and which is intended to accommodate the object to be localized and/or held.

Devices of this kind are used to localize and/or fixate objects in fixtures and the like. The objects in question may be, for instance, an abutment shoulder, a guide pin, a clamp unit, or some like workpiece. Previously, it has been necessary to produce such a device particularly for each case of use, which means that the work involved in designing and manufacturing the device takes a relatively long time and incurs considerable costs. Furthermore, it has not been possible hitherto to re-use the device, other than certain parts thereof.

The object of the present invention is to provide a device of the aforesaid kind which is simple and inexpensive and of which all parts can be re-used, and which enables fine adjustments to be made. Those objects are realized in accordance with the invention, by means of an object localizing and/or holding device that has the characteristic features set forth in the characterizing clause of claim 1.

Advantageous embodiments of the inventive device are set forth in the dependent claims.

Figure 2:
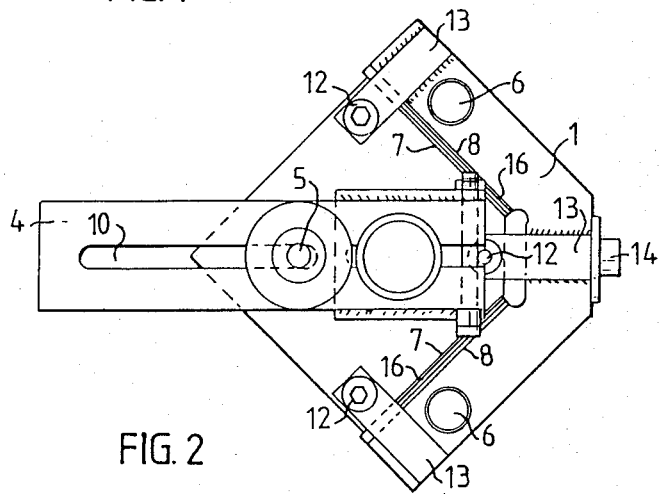

The invention will now be described in more detail with reference to the accompanying drawing, in which FIG. 1 is a side view of one embodiment of the inventive device; and FIG. 2 is a top plan view of the device illustrated in FIG. 1.

The essential components of the inventive device illustrated in the drawing include a localizing member 1, a base part 2 which cooperates with the localizing member 1, a spacing arm 3 which is attached to the base part 2, and an attachment 4 for accommodating the object to be localized and/or held, this object having the form of a guide pin 5 in the case of the illustrated embodiment.

The localizing member 1 of the illustrated embodiment is angular in shape and is intended to lie against a support surface, not shown. Each of the two legs of the localizing member 1 has provided therein holes for receiving guide elements and fasteners in the form of pegs or screws 6, which extend down into corresponding holes in the support surface, therewith to hold the localizing member firmly against said surface. Each leg of the localizing member has a surface 7 provided on the inner surface thereof, the surfaces 7 extending perpendicularly to the bottom surface of the localizing member 1 and to each other.

The base part 2 of the illustrated inventive device is substantially square in shape and has a thickness which is slightly smaller than the thickness of the localizing member 1. The base part 2 has a flat bottom surface for abutment with the support surface, and two abutment surfaces 8 which extend perpendicularly to said bottom surface and to each other, these abutment surfaces 8 being intended to abut the surfaces 7 on respective legs of the localizing member 1.

The spacing arm 3 is attached to the base part 2 and extends essentially vertically therefrom. The spacing arm 3 of the illustrated embodiment has the form of a circularcylindrical tube, although other configurations are conceivable of course. The spacing arm 3 is fitted into the base part 2 in a manner to take a specific position relative thereto and to enable the arm to be disconnected from said base part.

The object attachment 4 is configured so that it fits onto the spacing arm and so that it can be rotated and displaced in the direction of the longitudinal axis of the arm. The attachment 4 is secured on the spacing arm 3 by means of screws 9 which extend through a slotted part of the attachment and which can be tightened so as to clamp the attachment 4 firmly to the spacing arm 3. The attachment 4 is also provided with a slot 10, which extends in the direction of the longitudinal axis of the attachment 4 and in which a guide pin 5 is slideably arranged. The lower part of the guide pin extends through the slot 10 and can be clamped firmly to the carrier 4 with the aid of a nut 11 located on the undersurface of the carrier 4.

The localizing member 1 is held against the support surface (not shown) with the aid of the bolts 6, whereas the base part 2 is held against the support surface with the aid of bolts 12 provided in brackets 13, which are fastened to the localizing member 1 and project over the base part 2. The abutment surfaces 8 on the base part 2 are drawn into abutment with the surfaces 7 on the respective legs of the localizing member 1 with the aid of a screw 14 which extends essentially along the bisector of the angle subtended by the abutment surfaces 7 and through a hole in the localizing member 1.

In order to enable subsequent adjustment to be made to the position of the base part 2 in relation to the support surface and in relation to the localizing member 1, or to enable the base part to be positioned to within fine limits, a number of spacing washers or shims 15 are placed between the support surface and the bottom surface of the base part 2 during the initial stage of mounting the device in position, while at the same time further spacing washers or shims 16 are placed between each of the abutment surfaces 8 of the base part 2 and the corresponding surfaces 7 on the legs of the localizing member 1. Fine settings or fine adjustments can then be accomplished, by removing or adding shims 15 and 16 until the desired setting is achieved.

It will be understood that the invention is not restricted to the aforedescribed embodiment, but that modifications can be made within the scope of the following claims.

I claim:

1. An assembly suitable for use for localizing or holding an object firmly in place, said device comprising positioning means comprising two legs defining two vertically-oriented abutment surfaces angularly displaced with respect to one another, means to attach said positioning means to a supporting surface, a base member comprising two vertically-oriented abutment surfaces configured to permit mating engagement with said abutment surfaces of said positioning means, a spacing arm fixed to and extending vertically from said base, and object localizing means extending from said spacing arm and spaced vertically from said base.

2. The assembly of claim 1 wherein each said abutment surfaces are perpendicular to said supporting surface.

3. The assembly of claim 1 further including means to fix said base to said positioning means.

4. The assembly of claim 1 further including shim means between said abutment surfaces of said positioning means and said base.

5. The assembly of claim 3 wherein said means to fix said base to said positioning means comprises fastening means which extends through said positioning means and cooperatively engages both said positioning means and said base.

6. The assembly of claim 5 wherein said means to fix said base to said positioning means acts along a line which bisects the angle subtended by the abutment surfaces of said positioning means.

7. The assembly of claim 1 wherein said abutment surfaces of said positioning means are perpendicular to one another.

8. The assembly of claim 1 wherein said object localizing means is rotatable about said spacing arm.

9. The assembly of claim 1 wherein said base and said positioning means each have flat bottom surfaces.

10. The assembly of claim 1 wherein said base is substantially square in configuration.

11. The assembly of claim 1 wherein the thickness of said base is less than the thickness of said positioning means.

12. the assembly of claim 1 wherein said spacing arm is removable attached to said base.

* * * * *